Aug. 3, 1971 A. SHAINES 3,597,425

PLASTIC MOLDING PROCESS

Filed April 14, 1969

INVENTOR.
Alfred Shaines
BY
Sheldon H. Parker
ATTORNEY

United States Patent Office 3,597,425
Patented Aug. 3, 1971

3,597,425
PLASTIC MOLDING PROCESS
Alfred Shaines, Fanwood, N.J., assignor to American Standard Inc., New York, N.Y.
Filed Apr. 14, 1969, Ser. No. 815,934
Int. Cl. B29c 9/00; B29d 9/08; B29g 1/00
U.S. Cl. 264—246
8 Claims

ABSTRACT OF THE DISCLOSURE

An improved dual compression molding process which includes the step of placing at least one heated preform of dissimilar thermo-setting resin on a nearly vertical surface of a partially cured base molding. A feature of the described process is that one or more preforms of resin can be distributed anywhere on the surface of the partially cured base molding which is to be coated therewith.

BACKGROUND OF THE INVENTION

Description

This invention relates to a dual compression molding process for coating articles having almost vertical surfaces which comprise the steps of (1) preheating a mold having a steep-sided cavity therein to at least 200° F., (2) placing thermo-setting resin the open mold, (3) closing said mold with a top force, thereby applying pressure to said resin for a period sufficient to form a partially polymerized base molding, (4) opening said mold, (5) placing at least one preform of a dissimilar thermo-setting resin on a nearly vertical surface of said base molding, (6) closing said mold with said top force, thereby compressing said preform and causing said preform resin to liquefy and flow over the surface of said base molding to form a coating thereon, and (7) opening said mold to remove said coated article therefrom. More particularly, the process relates to a method of forming a lavatory having an unfilled melamine coating on the interior surface of a steep-sided alpha-cellulose filled melamine, base molding.

The described dual compression molding process provides a method of fabricating a steep-sided, molded plastic article having a relatively uniform coating of a dissimilar plastic material on a surface thereof. Such coating may be either on the interior or the exterior surface of the molded article, and the coating may cover either the whole surface or only part of the surface. The purpose of the coating may be to improve the strength, abrasion resistance, heat resistance, acid resistance, alkali resistance, water resistance or stain resistance of the molded article or, alternatively, to cover the surface for decorative purposes as with a different color.

Various molding methods have been used to produce coated plastic articles. For example, efforts have been made to apply a thin layer of plastic resin powder to one surface of a mold cavity and to apply over this a layer of a second plastic resin powder or a different colored plastic resin powder. However, such processes failed to consistently produce uniformly coated articles because of the difficulty in controlling the movement and flow of plastic resin during the compression step. A second method for molding two-color plastic articles was to use two different compressive die members (forces), with a second force which has a slightly different size than the first force being used to mold the second color on top of the base molding formed by the first force. While such a process produced uniformly coated articles, the process was not economical especially for large molds such as used to make lavatories because two forces were needed and both required very accurate positioning and were therefore expensive. A third method which proved fairly satisfactory for relatively flat or contoured articles such as dishes was to reverse the conventional position of the molding dies, so that the male die is mounted on the bottom bed of the press and the female die is mounted on the vertically reciprocal top force of the press. Such method is asserted to produce uniform two-toned, molded articles. However, such process is not satisfactory for the production of steep-sided articles because "pinch-off" occurs due to the geometry of the mold thereby causing non-uniformly coated articles to be produced.

More particularly, "pinch-off" is a problem in the molding of large articles because the flow of resin is not uniform in all directions and because the resin tends to become more viscous and set up as it flows over the hot surface. The problem is primarily manifested in the molding of steep-sided plastic articles, particularly where the angle at which the steep-side intersects the vertical plane is in the range of 3 to 20°. The problem is even more acute where the length of the steep-side is equal to or greater than about one and one-half times the dimension of the adjacent molded top or bottom of the article. Since the heated preform of thermosetting resin is normally placed on a horizontal surface, it is obvious that the side walls to be coated, either exteriorly or interiorly, are closely proximate to the corresponding surface of the upper die at the time the top force compresses the preform sufficiently to cause the resin in the preform to liquefy and flow. This problem is particularly acute in situations where the included angle approaches the minimum 3° angle and where the length of the substantially vertical side is significantly greater than the length of the adjacent molded top or bottom. Thus, the problem resides in the geometry of steep-sided articles and results from the placement of the resin preform on a horizontal surface of the mold cavity.

In the present dual-molding process, the "pinch-off" problem is obviated by the step of placing at least one heated preform of the thermo-setting plastic resin on the steep-sided or substantially vertical surface of the article to be coated. It has been discovered that the resin preform readily adheres to the hot surface of the "partially-set" base molding or to the nearly vertical surface of the mold. Such placement of the preform brings it into contact with top compression force at a time when the side wall to be coated and the corresponding surface of the upper die are still sufficiently far apart to assure substantially free flow of the liquid resin over the surface to be coated. This procedure results in the formation of a thin, even coating on the finished plastic article.

As stated above, it is desirable in carrying out the described process to control the initial compression time, temperature and pressure. The initial thermo-setting plastic resin should be compressed initially for a time sufficient to yield a base molding having a surface hardness capable of withstanding the second compression step, but insufficient to cause the plastic to completely polymerize and harden. If the surface of the base molding is too soft, distortion may occur during the second compression step; whereas, if the surface of the base molding is too hard, i.e., completely polymerized, cracking may occur or the surface may not laminate properly with the coating to form a solid, integral coated article. To achieve the proper "partial-set," the molding time, the molding temperature and the compression force must be carefully adjusted relative to the type of resin used and the geometry of the desired product.

BRIEF DESCRIPTION OF THE DRAWINGS

The invention and its advantages will be more clearly apparent from the following detailed description with references to the accompanying drawings wherein.

DESCRIPTION OF THE PREFERRED EMBODIMENTS

The disclosed method involves a dual compression operation. In the first compression step, plastic powder or a preform thereof is compressed and partially polymerized to form a base molding article. In the second compression step, at least one heated preform of a coating material of a different composition, color or type from the base resin is affixed to a steep side of the "partially set" base molding and compressed and caused to liquefy and flow over the surface of the base molding to form a coating thereon.

Figure 1:
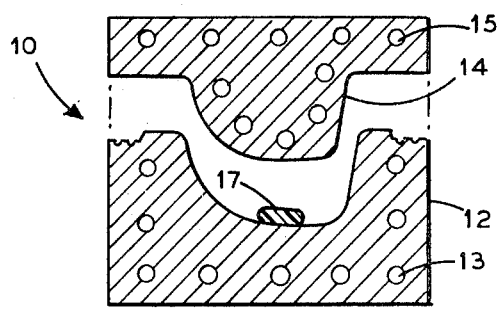
FIG. 1 is a cross-sectional view of a typical compression mold in the open position showing a preform of plastic in position prior to the first closing of the mold.
Figure 2:
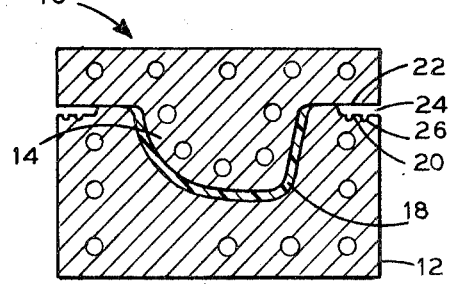
FIG. 2 is a cross-sectional view of the mold in the closed position with pressure applied thereto.

A typical mold which may be used in the disclosed method is described in FIG. 1. The mold 10 comprises a female die 12 and a male die 14. The male die 14 is mounted upon or attached to the upper platen of the press (not shown) which is normally vertically reciprocable. The female die forms the base of the mold 10. As shown in FIG. 2, the male die is so dimensioned that a cavity 18 will be formed between itself and female die 12 when the male die 14 is lowered into the female die 12.

In the first compression step, mold 10 is preheated to a temperature of at least 200° F. and preferably to about 280° to 380° F. by passing high pressure steam or heated oil through conduits 13 and 15. Alternatively, the mold may be heated by an electric heater or gas flames. A thermosetting resin in an amount sufficient to more than fill mold cavity 18 is placed into the open mold 10. The molding resin may be in particulate form or as a preform 17. Preferably, the molding resin will be preheated to a temperature in the range of about 150° F. to 300° F. to reduce the molding time and to enhance the dimensional stability and physical properties of the molded articles. Preheating of the molding resin may be accomplished in a hot air oven, by infrared heating or by dielectric heating, with the latter usually being the most efficient and effective.

When the mold 10 is closed as shown in FIG. 2, and a pressure in the range of 1,000 to 12,000 p.s.i.g. is applied thereto, the resin in preform 17 liquefies due to the heat and pressure and fills cavity 18 with liquid plastic. The excess molding resin flows laterally through the narrow opening 24 formed between flange 20 on female die 12 and flange 22 on male die 14 to form a flashing which encircles the periphery of the cast article. This flashing is later removed in any suitable manner, e.g. grinding. Pressure is maintained on the resin for a period sufficient to form a partially polymerized base molding having sufficient surface hardness to withstand the second compression step without distortion. The time required to obtain a properly "partially cured" base molding is determined by properly adjusting the preheat temperature, molding time, mold temperature, and the thickness and the geometry of the article to be produced. At the expiration of the compression period, mold 10 is opened by returning the force to its upper position.

Small grooves or nicks 26, may be provided in the die in which the "partially-set" molded article is to be held or retained when the mold opens. These undercuts should be kept as small as possible and should be placed in such position that they will not adversely affect the appearance of the molded article.

Figure 3:
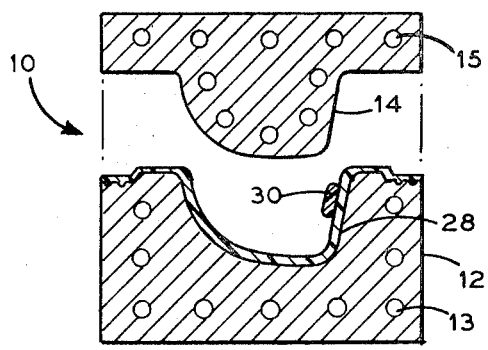
FIG. 3 is a view similar to FIG. 1 showing the mold in open position at the completion of the first molding step and showing a preform of plastic coating material in place on a nearly vertical surface of the base molding.
Figure 4:
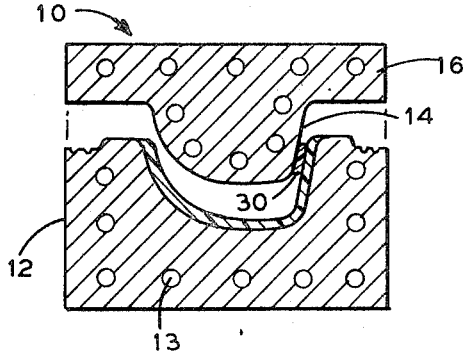
FIG. 4 is a cross-sectional view of the mold of FIG. 3 at the time the top die contacts the preform of coating material during the second compression step.

After the completion of the first compression step, at least one heated preform 30 of a thermo-setting resin having different characteristics than the base molding resin, e.g., different resin or the same resin having a different color or with different additives, is pressed against the surface of a steep side of base molding 28 as shown in FIG. 3. Prior to insection of this preform of coating material 30, it may be preheated to reduce the molding time. Preform 30 is considerably smaller than the preform 17 because the coating layer is relatively thin. However, again the amount of resin contained in preform 30 is more than sufficient to overfill the mold cavity. The mold is then closed by lowering male die 14 as shown in FIG. 4. In order to prevent the preform 39 from being wiped off the vertical surface as the male die descends into the female cavity, the preform pill should be high up on the sides of the cavity and its thickness should be such that the male die will not touch it until the male die is quite far into the cavity.

Figure 5:
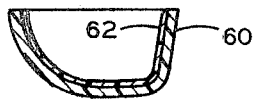
FIG. 5 is a cross-sectional view through a typical article formed by the process.

The mold is maintained in the closed position for a period sufficient to to set the relatively thin layer of plastic resin 62 shown on the base molding 60 in FIG. 5. Generally the die is maintained under pressure from 10 to 600 seconds, preferably from 30 to 150 seconds. At the conclusion of the second compression step, force 16 is raised and the molded plastic article is removed from mold 10 using conventional knockout pins (not shown).

As shown in FIG. 5, after the flashing has been removed by conventional means, e.g., tumbling, blasting, by hand, or otherwise, the resultant molded article has a thin coating of dissimilar resin over the whole of its interior surface. The thickness of the coating may vary with its particular requirements such as its color hiding power its abrasion, staining or cigarette scorch resistance, but is usually from 0.5 to 10 mils thick. This coating is substantially uniform, but may vary somewhat in accordance with the angle at which the surface being coated intersects the vertical plane, with the thickness descreasing as the included angle decreases.

Figure 4A:
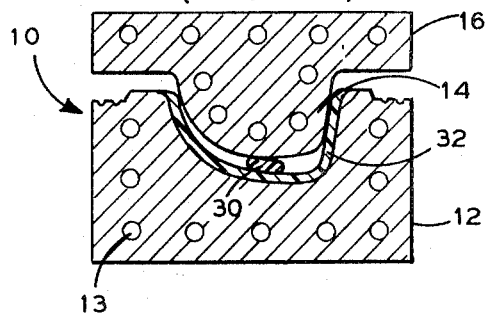
FIG. 4a is similar to FIG. 4 with the exception that it represents the prior art because the preform is located on the horizontal bottom surface of the base molding.

By way of comparison FIG. 4a illustrates the "pinch-off" problem when the preform 30 is placed on the bottom wall of the cavity in female die 12. When mold 10 is closed by lowering force 16, the first contact of male die 14 with preform 30 occurs when the corresponding steep sides of the male and female dies are practically touching one another at 32. Under these circumstances, the liquified resin which becomes very viscous as it flows along the hot surface cannot be forced into the small gap between the male die and the base molding near the top of the cavity and is "pinched off" and prevented from flowing past point 62 and, therefore, it is not possible to achieve a uniform coating on the surface of the resultant molded article.

From the foregoing description, it will be apparent that the invention generally relates to a dual compression molding process for coating articles having almost vertical surfaces which comprises: (1) preheating a mold having a steep-sided cavity therein to at least 200° F.; (2) placing thermo-setting polymerizable resin in the open mold; (3) closing the mold with a top force and thereby applying pressure to the resin for a period sufficient to form a partially polymerized base molding; (4) opening the mold; (5) placing at least one preform of a dissimilar thermosetting, polymerizable resin on a nearly vertical surface of said base molding; (6) closing said mold thereby compressing the preform of coating material and causing the preform resin to liquefy and flow over the entire surface of the base molding in contact with the preform to form a uniform coating thereon; and (7) opening the mold to remove said coated article therefrom.

Various types of thermo-setting, polymerizable resins may be used in practicing this process all of which are well known to those skilled in the art. Generally suitable thermo-setting, polymerizable resins include resins of the following kinds or types: phenolic resins, e.g., phenol formaldehyde; silicone resins; polyester resins, e.g. diallyl phthalate; epoxy resins; alkyd resins; allylic resins; urea resins; and melamine resins. Also, suitable are the alloys or mixtures formed by adding chemicals, fillers or reinforcing materials to the resins of the foregoing types. In general, the properties or characteristics desired in the resultant plastic article determine the choice of the resin type. For example, phenolics exhibit good chemical, water, and heat resistance and have good electrical insulating properties; epoxies are resistant to strong acids and alkalies and solvents and have high tensile, compressive and flexural strength; and melamine resins are resistant to flame and electrical arcing.

In addition, the properties of the thermo-setting polymerizable resins may be modified by including a filler therein. For example, fiber glass has been used to reinforce polyester, epoxy and phenolic resins. Similarly, asbestos has been used to modify phenolic, polyester, epoxy, melamine and silicon type polymerizable resins to improve resistance to acids and alkalis. Sisal, cellulose and synthetic fibers, e.g., nylon, have also been used to reinforce the polymerizable resins. Generally the polymerizable resins modified with fillers are stiffer or more viscous and require higher molding pressures.

My invention will be further illustrated by the following example.

EXAMPLE 1

Using the apparatus shown in FIG. 1, 1200 grams of granular alpha-cellulose filled melamine resin is formed into 8 dense preforms or "pills." The preforms are heated to a temperature of 225° F. using a dielectric heater and are placed in the bottom of the open female die of the mold which is preheated to a temperature of about 300° F. The female die is shaped to conform to the underside of an 18 inch diameter, bowl-shaped lavatory having a back wall which forms an included angle of 10° with the vertical plane. The mold is closed by a corresponding male die mounted to a top force, and a pressure of 4000–5000 p.s.i.g. is applied to the preform for approximately 90 seconds. The mold is then opened and the partially cured lavatory base molding is retained on the female die.

Seven preforms each 1″ in diameter x ¼″ thick having a total weight of 21 grams are placed around the inside periphery of the partially cured base molding produced in the first compression step about ½″–1″ from the top horizontal surface. The mold is closed for the second cycle. After completion of the second cycle the mold is then opened and the molded lavatory having a coating of unfilled melamine of 2 mils thickness over the whole of its interior surface is removed therefrom using knockout pins. The average thickness of the lavatory walls and its bottom is approximately 0.200 inch. After cooling, the flashing on the molded lavatory is removed by filling.

The resultant molded lavatory exhibits superior abrasion, stain and cigarette resistance as compared with a similar lavatory without any interior coating of unifilled melamine.

A two colored plastic article is made in a similar manner with the exception that the second polymerized resin is of a different color. The amount of colored resin determines whether the surface is coated in whole or in part. By suitable placement of preforms of different colors, multicolored articles may be achieved.

While the inventive process has been described with respect to a single embodiment, it is not intended that such embodiment shall be regarded as limiting the scope of the invention. It will be obvious to those skilled in the art that other modifications and variations of the invention can be made without departing from the process principles disclosed. More particularly, the description of molds, molding times, molding temperatures, polymerizable resins, and fillers have been minimized because these are variable. The number of preforms of coating material used and their placement may be varied. Furthermore, the placement of the male and female dies may be interchanged so that the male die may form the base of the mold on which the partially-cured base molding is retained.

The preform "pills" for the second molding operation may also be placed on the metal mold rather than on the walls of the partially polymerized base molding cavity.

Although the invention has been described in its preferred forms with a certain degree of particularity, it is understood that the present disclosure of the preferred forms has been made only by way of example, and that numerous changes in the details of construction and the combination and arrangement of parts may be resorted to without departing from the spirit and the scope of the invention.

What is claimed is:

1. In a dual compression molding process for fabricating a steep-sided article of thermo-setting polymerizable resin having a relatively uniform coating of dissimilar plastic on a surface thereof, the improvement which comprises placing at least one preform of coating material on a nearly vertical surface of a partially-cured base molding of thermosetting, polymerizable resin while said base molding is in a mold, closing said mold and applying sufficient pressure to cause said preform to liquefy and flow over the surface of said base molding to form a coating thereon and then removing said article from said mold.

2. A process in accordance with claim 1 wherein said preform is preheated to a temperature in the range of 150° F. and 300° F.

3. A process in accordance with claim 1 wherein said nearly vertical surface forms an angle with the vertical plane of about 3° to 20°.

4. A process in accordance with claim 1 wherein said dissimilar resin differs only in color from said polymerizable resin in said base molding.

5. A process in accordance with claim 1 wherein two or more preforms of said dissimilar thermo-setting, polymerizable resin are placed on said nearly vertical surface.

6. A process in accordance with claim 1 wherein at least one of said thermo-setting polymerizable resins contains a filler material.

7. A process in accordance with claim 1 wherein said base molding is formed of an alpha cellulose filled melamine resin and said dissimilar resin is unifilled melamine.

8. A dual compression molding process for coating articles having almost vertical surfaces which comprises: (1) preheating a mold having a steep-sided cavity therein to at least 200° F.; (2) placing thermo-setting, polymerizable resin in the open mold; (3) closing said mold with a top force, thereby applying pressure to said resin for a period sufficient to form a partically polymerized base molding; (4) opening said mold; (5) placing at least one preform of a dissimilar thermo-setting, polymerizable resin on a nearly vertical surface of said base molding; (6) closing said mold with said top force, thereby compressing said preform and causing said preform resin to liquefy and flow over the surface of said base molding in contact with said preform to form a coating thereon; and (7) opening said mold to remove said coated article therefrom.

References Cited

UNITED STATES PATENTS

| | | | |
|---|---|---|---|
| 2,874,419 | 2/1959 | May et al. | |
| 3,485,911 | 12/1969 | Reyburn | 264—246 |
| 3,309,448 | 3/1967 | Schilling | 264—255 |

ROBERT F. WHITE, Primary Examiner

A. M. SOKAL, Assistant Examiner

U.S. Cl. X.R.

264—255